(12) United States Patent
Kim et al.

(10) Patent No.: US 11,820,681 B2
(45) Date of Patent: Nov. 21, 2023

(54) VOLTAGE-CONTROLLED ANION EXCHANGE MEMBRANE ENABLING SELECTIVE ION AFFINITIES FOR WATER DESALINATION AND DEVICE CONTAINING THE SAME

(71) Applicant: Robert Bosch GmbH, Stuttgart (DE)

(72) Inventors: Soo Kim, Cambridge, MA (US); Jonathan Mailoa, Cambridge, MA (US); Mordechai Kornbluth, Brighton, MA (US); Georgy Samsonidze, San Francisco, CA (US); Michael Metzger, Sunnyvale, CA (US); Saravanan Kuppan, Sunnyvale, CA (US); Sondra Hellstrom, East Palo Alto, CA (US); Boris Kozinsky, Waban, MA (US); Nathan Craig, Burlingame, CA (US)

(73) Assignee: Robert Bosch GmbH, Stuttgart (DE)

( * ) Notice: Subject to any disclaimer, the term of this patent is extended or adjusted under 35 U.S.C. 154(b) by 853 days.

(21) Appl. No.: 16/599,369

(22) Filed: Oct. 11, 2019

(65) Prior Publication Data
US 2020/0131058 A1 Apr. 30, 2020

Related U.S. Application Data

(60) Provisional application No. 62/751,006, filed on Oct. 26, 2018.

(51) Int. Cl.
*C02F 1/469* (2023.01)
*C02F 1/461* (2023.01)
(Continued)

(52) U.S. Cl.
CPC .............. *C02F 1/4691* (2013.01); *C02F 1/04* (2013.01); *C02F 2001/46133* (2013.01);
(Continued)

(58) Field of Classification Search
CPC ................ C02F 1/4691; C02F 2103/08; C02F 2201/46115
See application file for complete search history.

(56) References Cited

U.S. PATENT DOCUMENTS 7,833,400 B2  11/2010  Andelman et al.
9,023,902 B2   5/2015  Lin et al.
(Continued)

OTHER PUBLICATIONS

Li et al. ("Modification and properties characterization of heterogeneous anionexchange membranes by electrodeposition of graphene oxide (GO)", Applied Surface Science, 442 (Feb. 2018) 700-710). (Year: 2018).*

(Continued)

*Primary Examiner* — Alexander W Keeling
(74) *Attorney, Agent, or Firm* — Maginot, Moore & Beck LLP

(57) ABSTRACT

A desalination device includes a container, first and second electrodes, an anion exchange membrane (AEM), and a power source. The container contains saline water that has an elevated concentration of dissolved salts. The AEM separates the container into first and second compartments into which the first and second electrodes, respectively, are arranged. The AEM has a continuous porous structure and a plurality of negatively-charged oxygen functional groups coupled to the porous structure. The power source is configured to selectively apply a voltage to one of the first and second electrodes. The AEM has a selective permeability when the voltage is applied such that cations in the saline water solution have a first diffusion rate $d_1$ therethrough and anions in the saline water solution have a second diffusion rate $d_2$ therethrough. The first diffusion rate $d_1$ is less than the second diffusion rate $d_2$ and greater than or equal to zero.

10 Claims, 5 Drawing Sheets

(51) Int. Cl.
*C02F 1/04* (2023.01)
*C02F 103/08* (2006.01)

(52) U.S. Cl.
CPC ............. *C02F 2001/46161* (2013.01); *C02F 2103/08* (2013.01); *C02F 2201/46115* (2013.01); *C02F 2201/46135* (2013.01)

(56) References Cited

U.S. PATENT DOCUMENTS

| | | | |
|---|---|---|---|
| 10,022,680 | B2 | 7/2018 | Willis et al. |
| 10,023,479 | B2 | 7/2018 | Cho et al. |
| 2013/0284601 | A1 | 10/2013 | Van Der Wal et al. |
| 2018/0148355 | A1* | 5/2018 | Smith .................. B01D 61/422 |
| 2020/0070094 | A1* | 3/2020 | Hussaini ............ B01D 67/0067 |

OTHER PUBLICATIONS

AGC Engineering Co., Ltd., "Selemion Ion-Exchange Membranes," Product Catalogue, Jan. 2018.
ASTOM Corp., "Ion exchange membrane [NEOSEPTA]", Product Information, available at www.astom-corp.jp/en/product/02.html (last accessed Nov. 16, 2018).
Cohen-Tanugi, D. et al., "Water Desalination across Nanoporous Graphene," Nano Letters, 12, 2012, pp. 3602-3608 (7 pages).
Schniepp, H. C. et al., "Functionalized Single Graphene Sheets Derived from Splitting Graphite Oxide Hannes," Journal of Physical Chemistry B. Letters, 110 (17), 2016, pp. 8535-8539 (5 pages).
Smith, K. C. et al., "Na-Ion Desalination (NID) Enabled by Na-Blocking Membranes and Symmetric Na-Intercalation: Porous-Electrode Modeling," Journal of the Electrochemical Society, 163 (3), 2016, pp. A530-A539 (11 pages).
Lee, J. et al., "Hybrid capacitive deionization to enhance the desalination performance of capacitive techniques," Energy and Environmental Science, 7, 2014 (7 pages).
Lee, J. et al., "Rocking Chair Desalination Battery Based on Prussian Blue Electrodes," ACS Omega, 2, 2017, pp. 1653-1659 (7 pages).
Cohen-Tanugi, D. et al., "Quantifying the potential of ultra-permeable membranes for water desalination," Energy & Environmental Science, 7, 2014, pp. 1134-1141 (8 pages).
Kim, S. et al., "Na2FeP2O7 as a Novel Material for Hybrid Capacitive Deionization," Electrochimica Acta, 203, 2016, pp. 265-271 (7 pages).
Zhou, K.-G. et al., "Electrically controlled water permeation through graphene oxide membranes," Nature, 559, 2018, pp. 236-254 (19 pages).
Chen, J. et al., "An improved Hummers method for eco-friendly synthesis of graphene oxide," Carbon, 64, 2013, pp. 225-229 (5 pages).
Hummers, W. S. et al., "Preparation of Graphitic Oxide," Journal of the American Chemistry Society, 80 (6), 1958, p. 1339 (1 page).

* cited by examiner

VOLTAGE-CONTROLLED ANION EXCHANGE MEMBRANE ENABLING SELECTIVE ION AFFINITIES FOR WATER DESALINATION AND DEVICE CONTAINING THE SAME

This application claims the benefit of U.S. Provisional Application 62/751,006, filed Oct. 26, 2018, the disclosure of which is incorporated herein by reference in its entirety.

FIELD

The disclosure relates to electrochemical treatment of water and more particularly to anion exchange membranes with materials that enable selective ion affinities for water desalination devices.

BACKGROUND

The demand for fresh, potable water is substantial and securing fresh and drinkable water sources for an increasing population on the Earth is one of the most important challenges in the twenty-first century. Increased amounts of fresh water are not only needed for human consumption, but also required for industrial and agricultural activities. Desalination is an emerging technology used to acquire fresh water from otherwise non-fresh sources and involves removing salt and other impurities from seawater. The desalination process can be implemented in different ways such as via thermal (e.g., heating and drying process, thermal distillation), applying electrical energy (i.e., charge-based separation of ions), and via mechanical energy/pressure (e.g., reverse osmosis (RO), membrane-based filtration)

Capacitive deionization (CDI) is one technology that uses electrical energy to carry out charge-based separation of ions. A CDI device typically includes a cathode and an anode. During a purification cycle, cations are added to the cathode and anions are added to the anode. The next cycle applies a voltage to flush the ions out of the electrodes, expelling an impurity-heavy wastewater. The electrodes are then available for the next purification cycle. In some implementations, a CDI device includes at least two cation intercalation host electrodes separated by an anion exchange membrane (AEM) for water desalination and cleaning processes. This technique is sometimes referred to as the hybrid capacitive deionization (HCDI) technique and has been discussed in recent literature, including *Energy Environ. Sci.*, 2014, 7, 3683; *J. Electrochem. Soc.*, 2016, 163, A530; *Electrochim. Acta*, 2016, 203, 265; and, *ACS Omega*, 2017, 2, 1653.

FIG. 5 illustrates a conventional electrochemical device 500 that implements the HCDI technique to desalinate salt water from a water supply. The device 500 includes a first electrode 504, a second electrode 508 spaced from the first electrode 504, and an exchange membrane 512 disposed between the first and second electrodes. The membrane 512 is typically an anion exchange membrane (AEM) that separates the device 500 into a first salt water compartment 516 with the first electrode 504 and a second salt water compartment 520 with the second electrode 508. In some devices, cation intercalation host materials (typically such as $Na_{0.44}MnO_2$ or similar oxides) are used as the electrode components (i.e., cathode and anode). In other devices, the first electrode 504 is a cation intercalation host electrode and the second electrode 508 is a carbon-based electrode (e.g., porous carbon, activated carbon, etc.) coupled with the first electrode on the other side.

FIG. 5 illustrates the device 500 in a first operating state in which a positive voltage $V_{IN}$ is applied on the first electrode 504 (anode) and the second electrode 508 (cathode) is connected to the ground. In the first operating state, first target ions 524 such as $Na^+$ cations are released from the first electrode 504 and dispersed in the first compartment 516, which is sometimes referred to as the "brine compartment" in this operating state. As the $Na^+$ concentration in the first compartment 516 increases, electrostatic will create an electric field which attracts second target ions 528 such as the anion $Cl^-$ from the second compartment 520, which is sometimes referred to as the "clean compartment" or "fresh compartment" in the first operating state. As $Cl^-$ ions 528 move from the second compartment 520 to the first compartment 516, $Na^+$ ions 524 from the second compartment 520 intercalate into the second electrode 508 to maintain a neutral electrostatic charge, which completes the water desalination circuit. Via this desalination circuit, the device 500 in the first operating state increases salt concentration in the first compartment 516 and reduces salt concentration in the second compartment 520.

The brine water and the clean water produced in the first operating state are separately extracted after the water in the second compartment 520 is sufficiently cleaned by the device 500. To carry out another purification cycle, the first and second compartments 516, 520 are filled with new salt water from the water supply. The device 500 is then run in a second operating state (not shown) in which a positive voltage is applied on the second electrode 508 and the first electrode 504 is connected to the ground. In the second operating state, the device 500 generates fresh water in the first compartment 516 (the "fresh compartment" in the second operating state) and generates brine water in the second compartment 520 (the "brine compartment" in the second operating state). The alternating operation of the device 500 helps maintain the amount of $Na^+$ ion concentration in the intercalation host electrode materials within a desired range. It will be appreciated that this process works only if the tendency for $Na^+$ to diffuse from the brine compartment to the clean compartment is slowed or blocked by the anion exchange membrane (AEM) 512, which restricts the diffusion of $Na^+$ cations while promoting the unobstructed diffusion of anions (e.g., $Cl^-$). Therefore, the selective ion permeability of the AEM 512 of the device 500 greatly influences the overall efficiency of the water desalination process.

The typical anion exchange membrane (AEM) used for the HCDI technique, such as the AEM 512, includes "fixed" positively-charged groups that reject the cation transport through the AEM while allowing the anion transport. It is desired to produce a thin, low resistance, and scalable AEM for the water desalination process that allows a selective ionic diffusion. For example, graphene and graphene oxide (GO) are electrically-conducting 2D materials that have been suggested for use in water filtration applications. (*Nano Lett.* 2012, 12, 3602 and *Energy Environ. Sci.* 2014, 7, 1134). In these suggested applications, "applied pressure" allows the water molecules to permeate through while leaving salts from brine water in the graphene filter. Recent literatures has also demonstrated that applying electrical voltage on GO will modify the water transport and diffusion characteristic across the GO sheet (*Nature*, 2018, 559, 236).

What is needed, therefore, is an AEM that improves the efficiency of water desalination using an HCDI device. An AEM that improves efficiency via a specific controlled chemical functional group that is configured to encapsulate and trap ions at a controlled voltage would be further advantageous.

SUMMARY

An anion exchange membrane for a desalination device in one embodiment includes a membrane support that has a porous first side, a porous second side, and a continuous porous structure that extends from the first side to the second side. The continuous porous structure includes graphene oxide (GO) sheets and a plurality of negatively-charged oxygen functional groups coupled to the GO sheets.

A desalination device in one embodiment includes a container, a first electrode, a second electrode, an anion exchange membrane (AEM), and a power source. The container is configured to contain a saline water solution that has an elevated concentration of dissolved salts. The AEM separates the container into a first compartment and a second compartment. The first and second electrodes are arranged in the first and second compartments, respectively, and are configured to be in fluid communication with the saline water solution. The AEM has a porous membrane structure and a plurality of negatively-charged oxygen functional groups coupled to the porous membrane structure. The power source is configured to selectively apply a voltage to one of the first and second electrodes while the other of the first and second electrodes is connected to ground. The AEM has a selective permeability when the voltage is applied such that cations in the saline water solution have a first diffusion rate $d_1$ therethrough and anions in the saline water solution have a second diffusion rate $d_2$ therethrough where $0 \leq d_1 < d_2$.

A method for desalinating water in one embodiment includes filling respective first and second compartments of a container with a saline water solution that has an elevated concentration of dissolved salts. The container includes first and second electrodes arranged in the first and second compartments, respectively, and an anion exchange membrane (AEM) that separates the first and second compartments. The method further includes operating the first and second electrodes in a forward direction or a reverse direction to release cations into one of the first and second compartments and to remove cations from the other of the first and second compartments. The method further includes applying a membrane voltage to the AEM while operating the first and second electrodes. The membrane voltage decreases a first diffusion rate of cations through the AEM and increases a second diffusion rate of anions through the AEM relative to the first and second diffusion rates when the membrane voltage is not applied to the AEM.

DETAILED DESCRIPTION

Figure 1:
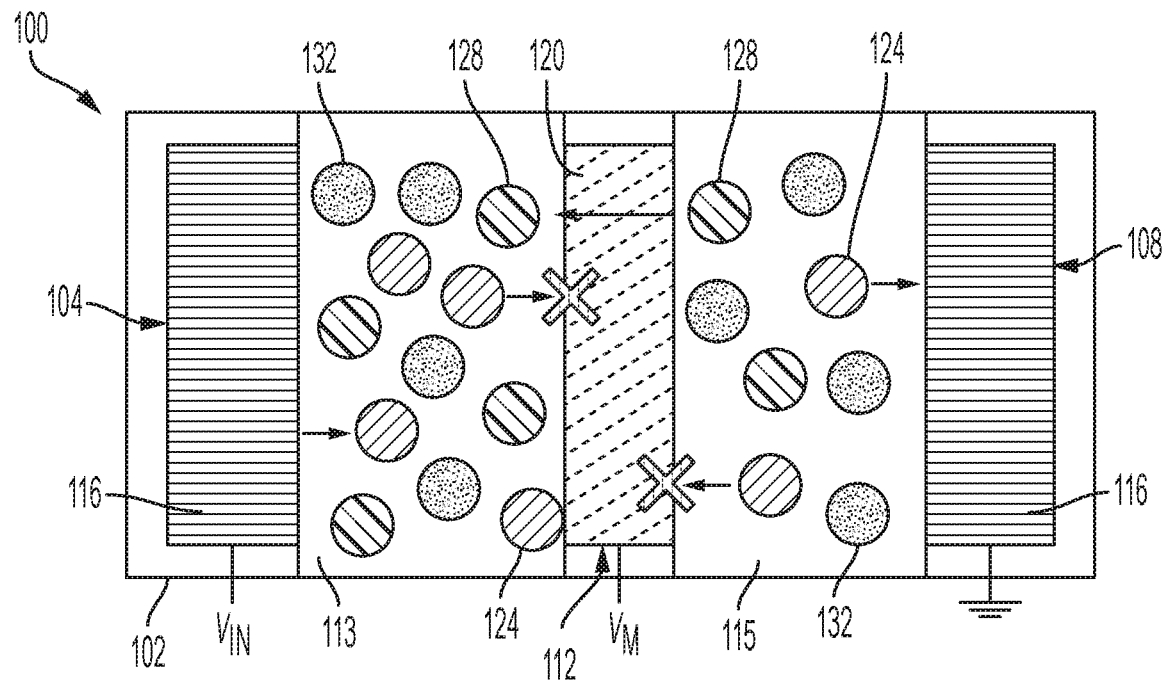
FIG. 1 is a simplified schematic of a hybrid capacitive deionization (HCDI) device configured to remove target ions from a water supply, the device shown in a first operating in state in which a first voltage is applied to one of two electrodes and a second voltage is applied to an anion exchange membrane (AEM) disposed between the electrodes.

For the purpose of promoting an understanding of the principles of the disclosure, reference will now be made to the embodiments illustrated in the drawings and described in the following written specification. It is understood that no limitation to the scope of the disclosure is thereby intended. It is further understood that the disclosure includes any alterations and modifications to the illustrated embodiments and includes further applications of the principles of the disclosure as would normally occur to one skilled in the art to which this disclosure pertains.

FIG. 1 illustrates a non-limiting first embodiment of a device 100 configured to remove ions from a water supply via a hybrid capacitive deionization (HCDI) process. The device 100 includes a container 102 configured to contain a liquid solution, such as a saline water solution that has an elevated concentration of dissolved salts 124, 128. The container 102 can be a container, compartment, housing, vessel, can, canister, tank, or the like of any shape, size, or configuration capable of obtaining, retaining, holding, and/or releasing a liquid solution such as saline water, brackish water, sea water, ocean water, fresh water, sweet water, drinking water, desalinated water, contaminated water, industrial water, etc. The container is spacious enough to house a sufficient amount of a water solution undergoing desalination; dimensions thus differ based on a specific application. The container can be large enough to serve industrial applications.

The container can be made from different materials capable of withstanding corrosion, temperature fluctuations, changing pH, varying pressure, and be resistant to other chemical, mechanical, and/or physical conditions. The container can be made from glass, plastic, composite, metal, ceramic, or a combination of materials. The container can feature one or more protective coatings. The container can be made from a material which minimizes occurrence of water contamination. The container can be made from material(s) which are nontoxic and comply with drinking water standards.

The device 100 further includes a first electrode 104, a second electrode 108 spaced from the first electrode 104, and an anion exchange membrane (AEM) 112 disposed between the first electrode 104 and the second electrode 108. The AEM 112 separates the container 102 into a first compartment 113 with the first electrode 104 and a second compartment 115 with the second electrode 108. The first and second electrodes 104, 108 are arranged within the container 102 to be in fluid communication with the saline water solution present in the first and second compartments 113, 115. The first and second electrodes 104, 108 are at least partially submerged in the saline water solution. The first and second 104, 108 electrodes in some embodiments can be fully submerged in the saline water solution. The first and second electrodes 104, 108 can be placed on the opposite sides of the container 102 separated by a distance as shown in the figures. The distance can be 1 mm or more, 1 cm or more, 10 cm or more, 20 cm or more, 30 cm or more, depending on the dimensions of the container 102 and the first and second electrodes 104, 108. Other distances between the first and second electrodes are contemplated as well.

The first and second electrodes 104, 108 in the embodiment shown each include an intercalation host material 116 that reversibly removes and releases first target ions 124 in different operating states of the device 100. Intercalation refers to reversible inclusion of one or more ions into materials with layered structures. The spaces between layers can serve as a temporary storage for one or more types of ions. The first target ions 124 in the illustrated embodiment include the cation $Na^+$ though in other embodiments the first target ions 124 can include the cations $K^+$, $Mg^{2+}$, $Ca^{2+}$, $Pb^{2+}$, and others. The intercalation host material 116 of the first and second electrodes 104, 108 in some embodiments includes similar alkali metal oxides or phosphates, such as $Na_xMnO_2$ and $Na_xMPO_4$, with variations in the alkali metal concentration, for example, via composition change of Na by varying x. In other embodiments, carbon-based and other oxide-based electrode materials can be used for fabricating the electrode materials in the device 100 via additional carbon and PVDF binders.

In further embodiments, the intercalation host material 116 of the first and second electrodes 104, 108 is at least one of doped or un-doped cubic spinel $MnO_2$, $Na_4Mn_9O_{18}$ (or equivalently, $Na_{0.44}MnO_2$) tunnel structured orthorhombic materials, and $NaM_2(PO_4)_3$ (where M=Ti, Mn, Fe, Ni, Cu, or combinations thereof), where the exact composition of Na can be controlled by thoroughly mixing different starting amount of $Na_2CO_3$ with metal oxide precursors and then followed by the heat treatment at high temperature (e.g., 800° C.). In these further embodiments, it is permissible to partially substitute Na (if any) with Li, Mg, Ca, and/or K.

The AEM 112 in the embodiment shown includes a membrane material 120 that has been identified using detailed first-principles density functional theory (DFT) calculations. The membrane material 120 of the AEM 112 in some embodiments includes mono- and few-layer graphene and graphene oxide (GO) sheets with at least one chemically-added functional group that is configured to encapsulate and trap the first target ions 124 in at least one operating state of the device 100. As used herein, "mono-layer" means the graphene and the GO can each be configured with a single layer, and "few-layer" means the graphene and the GO can each be configured with up to 8 layers. The chemical functional group is a negatively-charged oxygen-containing functional group that enables a slow diffusion of the first target ions 124 dissolved in the water supply (e.g., seawater or industrial water). The first target ions 124 in this embodiment include, but are not limited to, sodium, magnesium, calcium, potassium, strontium, silicon, carbon, and aluminum ions. The chemical functional group in the AEM 112 also allows a very fast diffusion of second target ions 128 between the electrodes 104, 108 due to the repulsive force between the negatively-charged AEM 112 and the second target ions 128 present in the water supply. The second target ions 128 in this embodiment include, but are not limited to, chloride, sulfur, bromine, nitrate, and ammonia.

The membrane material 120 of the AEM 112 in some embodiments includes a carbon- or polymer-based porous membrane structure and one or more of hydroxyl (—OH) oxygen functional groups and carboxylic (—COOH) oxygen functional groups coupled to the structure so as to enable selective cation (de-)adsorption processes in the AEM. In other embodiments, the chemically-added oxygen functional groups can include carbonyl (=O) oxygen functional groups, epoxy (—O) groups, or combinations thereof. In one example, hydroxyl (—OH) rich GO samples are prepared by Hummer's method, which is described in *Carbon,* 2013, 64, 225 & *J. Am. Chem. Soc.,* 1958, 6, 1339. First, graphite plate and $NaNO_3$ can be dispersed in $H_2SO_4$ at low temperature (e.g., 5° C.) and $KMnO_4$ can be added to the suspension. After continued stirring and dilution with water, the mixture can be heated up to approximately 100° C. and treated with $H_2O_2$. The resulting powder can be rinsed with HCl and deionized water. Since the entrapment of the first target ions 124 depends on the number of oxygen functional groups present in the GO, control of ion transports can be tuned via the processing method. In particular, further heat treatment can control the functional group density, followed by filtering, washing, and drying under vacuum.

The AEM 112 in some embodiments further includes a mixture of the membrane material 120 and other electronically conductive polymers, such as poly(pyrrole)s (PPY), polyanilines (PANI), poly(thiophene)s (PT), poly(3,4-ethylenedioxythiophene) (PEDOT), poly(p-phenylene sulfide) (PPS), poly(acetylene)s (PAC), and poly(p-phenylene vinylene) (PPV). The AEM 112 in other embodiments includes the membrane material 120 and other polymers that are not electronically conductive, but are ionically conductive, such as cross-linked poly-vinyl alcohol (PVA), cross-linked polymethylmethacarylate (PMMA), and polyethylene oxide (PEO). Additional electronically conductive material, such as graphite, hard carbon, soft carbon, carbon black, and others, can be added as needed.

Figure 3:
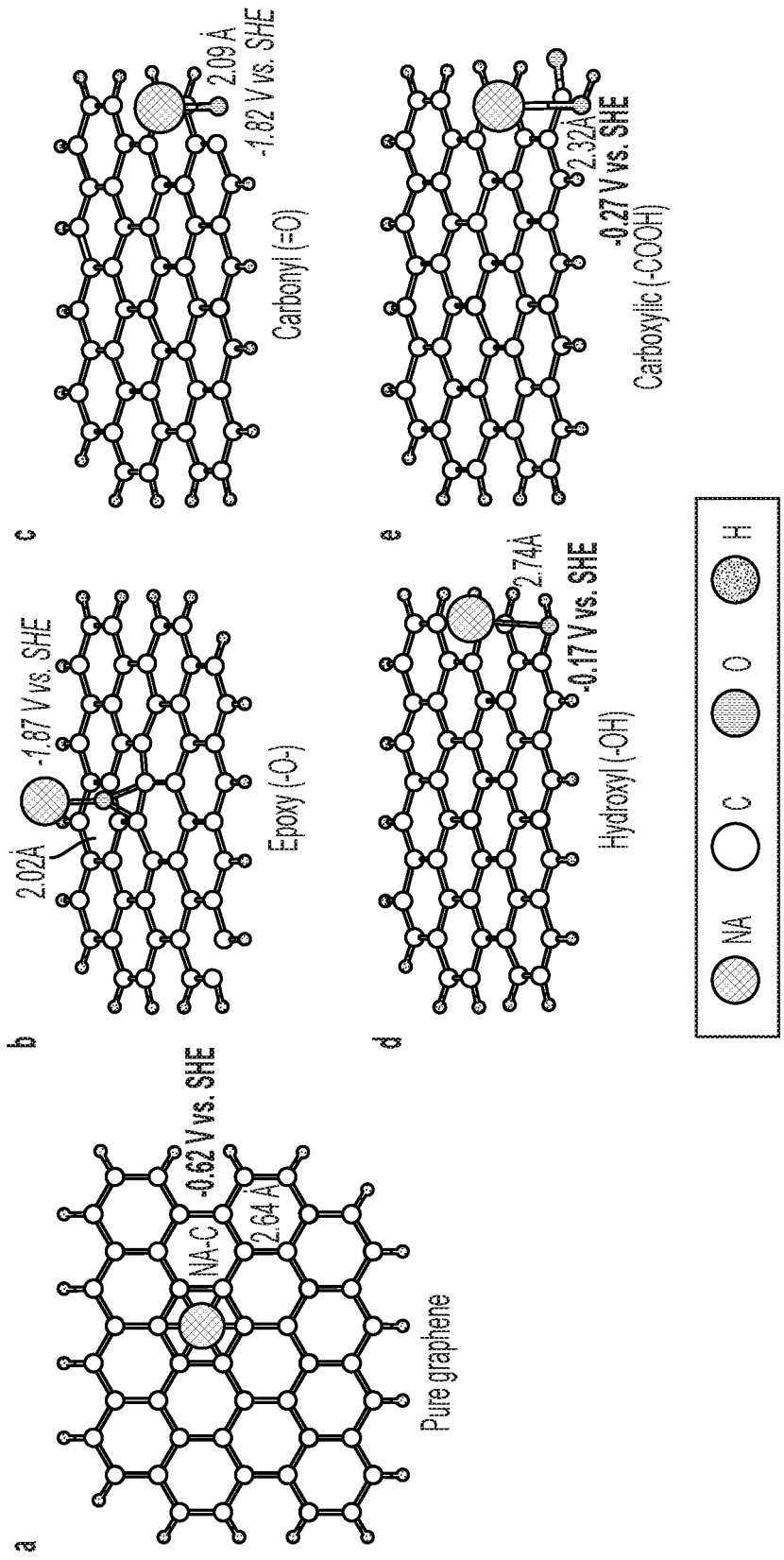
FIG. 3 illustrates adsorption of a Na$^+$ ion in different materials of the AEM of FIG. 1.

FIG. 3 structurally depicts $Na^+$ ion adsorption in the membrane material 120 disclosed herein. The structures illustrated in FIG. 3 include sodium (Na), carbon (C), oxygen (O), and hydrogen (H). These elements are distinguished from one another in the figure by use of different fill-patterns within the circles representing the elements according to the corresponding legend. The membrane material 120 is shown as: pure graphene in panel a, GO with epoxy (—O) group in panel b, GO with carbonyl (=O) group in panel c, GO with hydroxyl (—OH) group in panel d, and GO with carboxylic (—COOH) group in panel e. FIG. 3 further illustrates the calculated $Na^+$ ion adsorption voltage for each case illustrated in panels a-e. Pure graphene (panel a), GO with hydroxyl (panel d), and GO with carboxyl (panel e) meet the target voltage criteria within the water stability window (i.e., −0.401 to +1.23 V vs. standard hydrogen electrode (SHE), which can shift slightly due to the pH of the solution). Epoxy or carbonyl functional groups can be included in GO (panels b and c), but it may require more applied voltage to reversibly (de-)insert the cations.

Further calculations estimate the adsorption voltage of first target ions 124 other than $Na^+$ ions on some of the GO functional groups of the membrane material 120 disclosed herein. For example, Table 1 identifies the calculated voltage of K, Mg, and Ca adsorption on hydroxyl and carboxylic GO functional groups using first-principles density functional theory (DFT) calculations.

TABLE 1

| Voltage vs. SHE | K | Mg | Ca |
|---|---|---|---|
| Hydroxyl (—OH) | −0.908 | −0.915 | −1.119 |
| Carboxylic (—COOH) | −0.865 | −0.897 | −0.832 |

The results disclosed herein suggests that cations other than Na, Mg, K, and Ca ions can also be attracted by the GO-based AEM 112 within (or slightly outside of) the water stability window.

Figure 4:
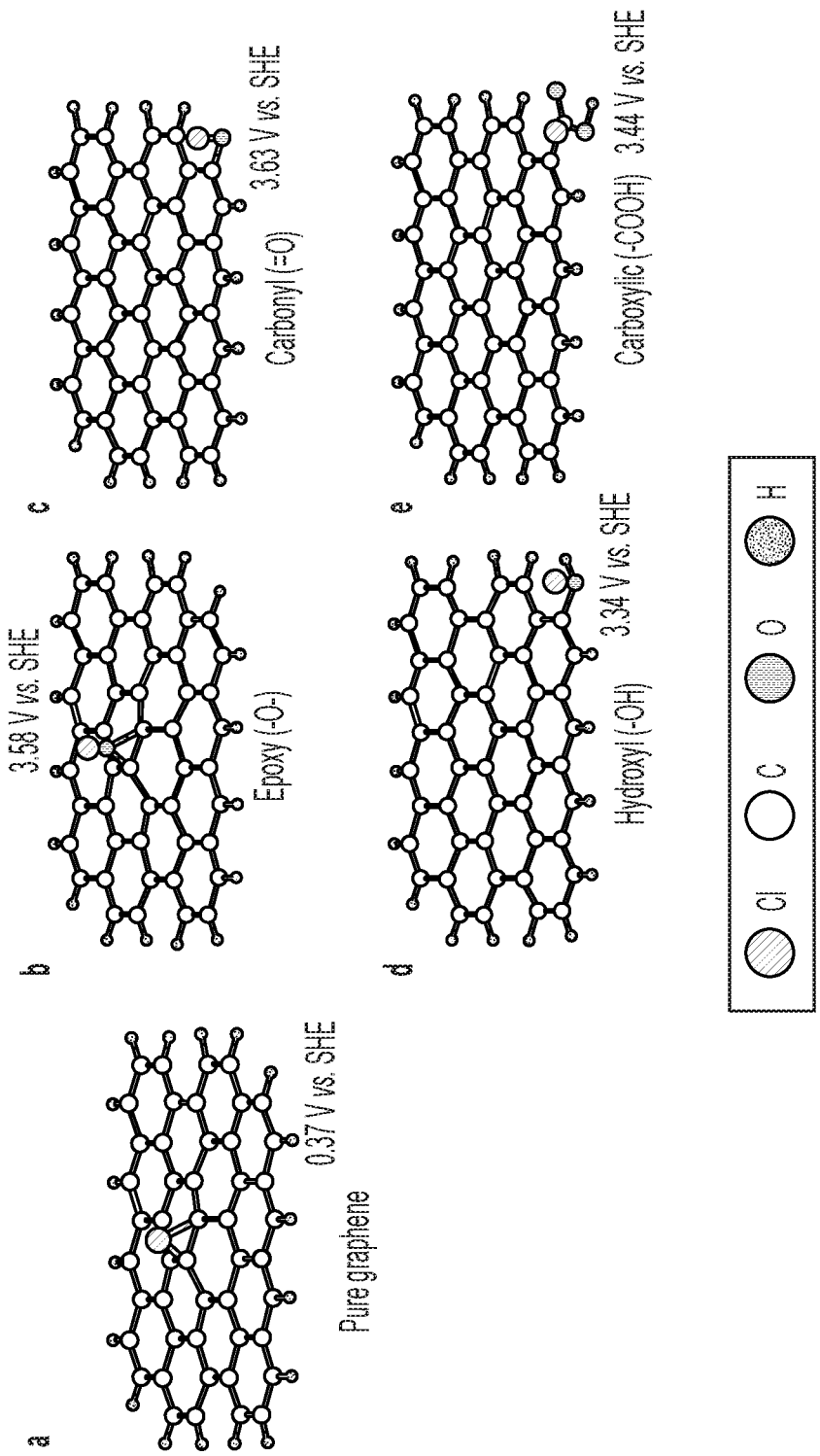
FIG. 4 illustrates adsorption of a Cl$^-$ ion in different materials of the AEM of FIG. 1.

FIG. 4 structurally depicts Cl⁻ ion adsorption in the membrane material 120 disclosed herein. The structures illustrated in FIG. 4 include chlorine (Cl), carbon (C), oxygen (O), and hydrogen (H). These elements are distinguished from one another in the figure by use of different fill-patterns within the circles representing the elements according to the corresponding legend. The membrane material 120 is shown as: pure graphene in panel a, GO with epoxy (—O) group in panel b, GO with carbonyl (═O) group in panel c, GO with hydroxyl (—OH) group in panel d, and GO with carboxylic (—COOH) group in panel e. FIG. 4 further illustrates the calculated Cl⁻ ion adsorption voltage for each case illustrated in panels a-e. As shown, all GO oxygen functional groups (panels b to e) repel the Cl⁻ ions. In other words, these GO oxygen functional groups require a very large voltage (greater than 3 eV) to attract the Cl⁻ ions. In contrast, it is possible that Cl⁻ ions would adsorb to pure graphene, for example, when approximately 0.4 V is applied, thereby forming a C—Cl—C epoxy-like bond, as described in panel a. To mitigate anion desorption in the AEM 112, the GO functional group populations can be maximized as noted in the above-described method of controlling the GO functional group density.

Further calculations also estimate the DFT binding energy of water on the GO functional groups of the membrane material 120 disclosed herein. For example, Table 2 identifies the binding energy of H₂O in eV/H₂O for the different GO functional groups.

TABLE 2

| GO functional groups | Binding energy of H₂O [eV/H₂O] |
| --- | --- |
| Epoxy (—O—) | +1.191 |
| Carbonyl (═O) | +1.184 |
| Carboxylic (—COOH) | +1.273 |
| Hydroxyl (—OH) | +1.285 |

Based on these calculations, at least approximately 1 eV is required for H₂O to bind to the GO functional groups. Therefore, the use of the GO-based AEM 112 disclosed herein will not impact the H₂O transport through the AEM. In other words, H₂O molecules 132 will pass through the AEM 112 as illustrated in FIG. 1.

In view of FIGS. 3 and 4, the (de-)sorption voltage of the first target ions 124 in the membrane material 120 of the AEM 112 disclosed herein is approximately within the water stability window (i.e., approximately −1.0 to 1.5 V vs. standard hydrogen electrode (SHE)). In some embodiments, the measured (de-)sorption voltage of the first target ions 124 can slightly exceed the water stability voltage window due potentially to one or more of kinetically-limited ion diffusion, activation over-potential, Ohmic resistance, and passivation layer formation. In contrast, a very large energy is required to attract the second target ions 128 such as single anion species F⁻, Cl⁻, Br⁻, I⁻, and S²⁻ and anion complexes such as ClO₄⁻, ClO₃⁻, ClO₂⁻, BrO₄⁻, BrO₃⁻, SO₄²⁻, SiO₃²⁻, and CN⁻ to the AEM 112. Therefore, the second target ions 128 pass freely through the AEM 112. In other words, the controlled modification of oxygen functional groups in graphene oxide (GO) allows a reversible cation (e.g., Na, Mg, K, and Ca) (de-)sorption within the water stability window by the entrapment of cations in the hydroxyl (—OH) and carboxylic (—COOH) groups of the membrane material 120. The anions such as Cl⁻ ion will not be bound by the oxygen function groups present at the GO, enabling fast anion diffusion through the GO.

With reference again to FIG. 1, the device 100 in some embodiments further includes an external circuit on the AEM 112 that is configured to apply a voltage bias on the AEM. An HCDI device with an AEM that does not have a voltage outlet (such as the device 500 of FIG. 5) will experience an effective "natural" voltage $V_{N,\,eff}$ ranging from the applied voltage, $V_{IN}$, and the ground on the electrodes. To enable more efficient and faster ionic exchange, the device 100 is further configured to apply a new membrane voltage $V_M$ on the AEM 112 with respect to the ground. In some embodiments, the membrane voltage $V_M$ is applied in a range from 0 to ±0.5 V. In some embodiments, one or more of the natural voltage $V_{N,\,eff}$ and the membrane voltage $V_M$ are controlled and tuned so as to control the rate of rate of adsorption and desorption of certain cations and anions in the AEM 112.

Figure 2:
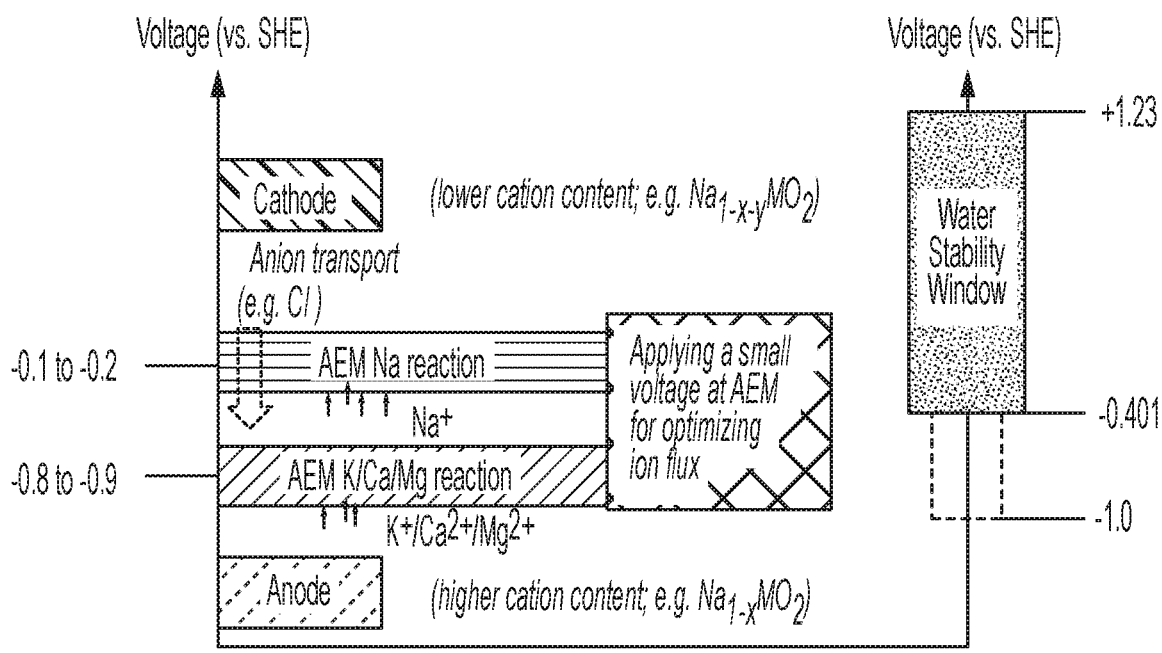
FIG. 2 is a schematic diagram illustrating a design strategy for using the AEM of FIG. 1 with a controlled redox voltage.

FIG. 2 is a schematic diagram that illustrates the design strategy for using the AEM 112 of the device 100 with a controlled redox voltage. The sodium ions are the most dominant species in the seawater where a slow diffusion will occur due to the tendency to adsorb to the negatively-charged species on the AEM while anions (e.g., Cl⁻) will pass through the AEM. Other cations such as K⁺, Ca²⁺, and Mg²⁺ will require a lower potential for a reversible reaction, which can compete within (or slightly outside of) the water stability window (i.e., −0.401 to +1.23 V, depending on the pH). There are lower concentrations of such cations (e.g., K⁺, Ca²⁺, and Mg²⁺) in the seawater though reversible extraction of these cations is still highly desirable. The electrodes 104, 108 in some embodiments include other oxide materials discussed herein for tuning the overall voltage window. The voltage in the y-axis drawn is not to scale.

Figure 5:
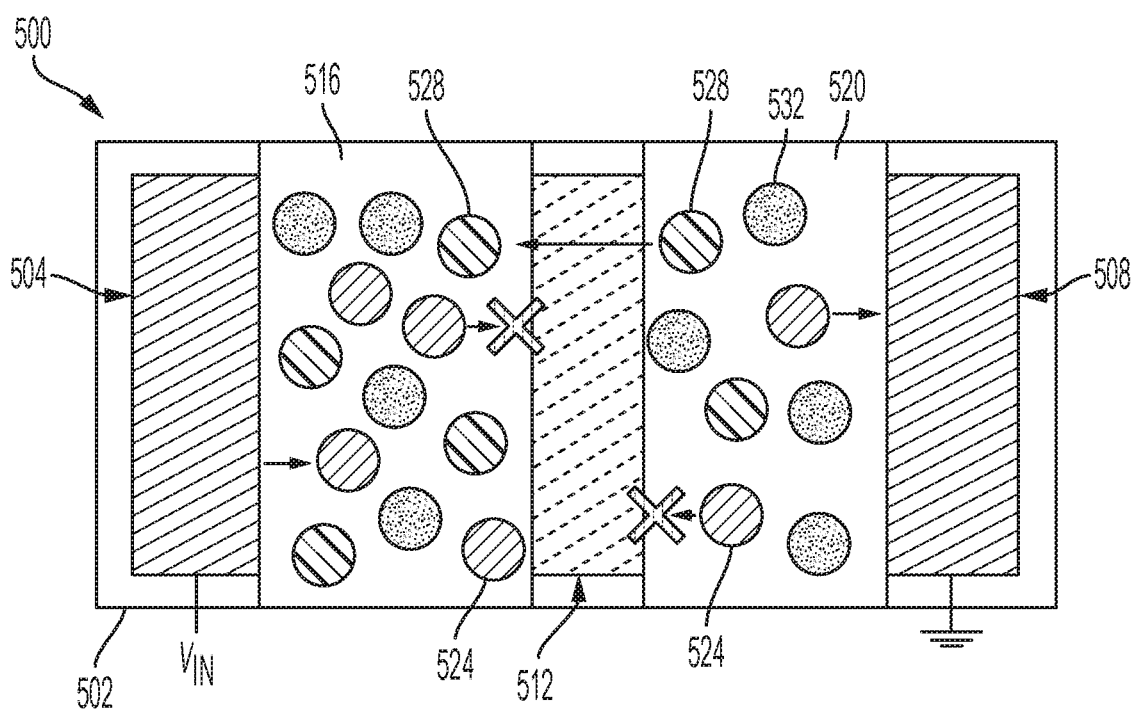
FIG. 5 is a simplified schematic of an HCDI device with a known AEM.

The basic operating principle of the device 100 of FIG. 1 to generate fresh water and brine water alternately in the first compartment 113 and the second compartment 115, respectively, is similar to that discussed with respect to the device 500 of FIG. 5. However, the device 100 includes the graphene oxide (GO)-based AEM 112 that maximizes oxygen functional groups such as hydroxyl (—OH) and carboxylic (—COOH) to enable the entrapment of cations (e.g., Na, Mg, Ca, and K). Furthermore, the device 100 applies a membrane voltage $V_M$ on the AEM 112 to allow more effective cation entrapment and enhanced anion diffusions through the AEM.

The device 100 in the embodiment shown includes symmetric electrodes 104, 108 to be used with the AEM 112 disclosed herein. The symmetric electrodes 104, 108 allow for a continuous collection of clean water in successive cycles for water purification. The device in other embodiments includes the AEM 112 disclosed herein used in connection with asymmetric electrodes (not shown) where the concentration of alkali metal within the metal oxide can be different between the electrodes. In further embodiments, the device includes two different electrode materials incorporated as an anode and a cathode in each of the two compartments. One compartment is connected to a reservoir to collect and/or precipitate salt, and the other compartment is connected to the clean water stream and alternately output purified water. The device in these further embodiments may require an extra cycle to regenerate the electrodes.

Figure 6:
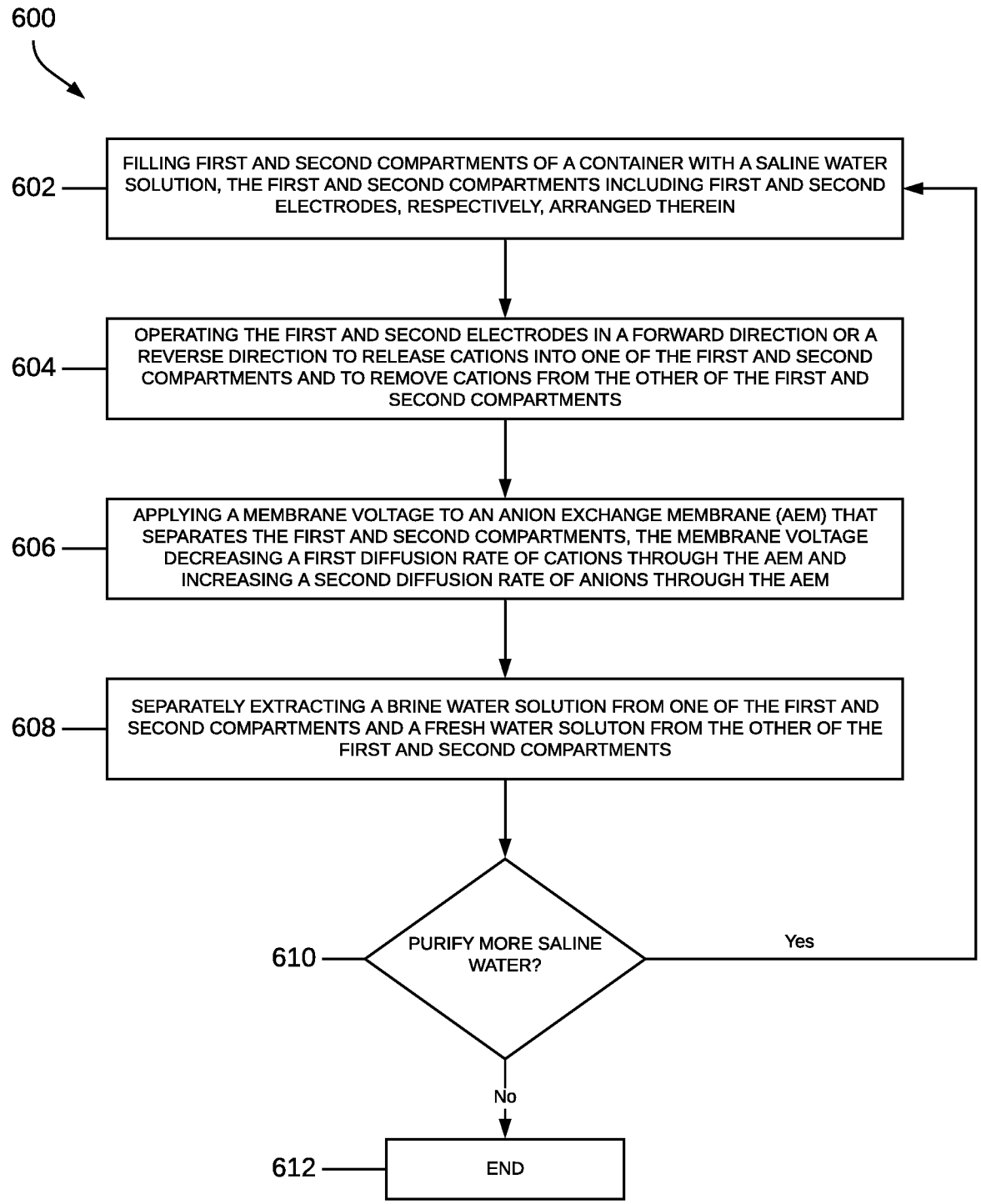
FIG. 6 depicts a method for desalinating water using the device of FIG. 1.

FIG. 6 depicts a method 600 for desalinating water using an HCDI device, such as the device 100 described with reference to FIGS. 1-4. The method 600 includes filling the first and second compartments 113, 115 of the container 102 with a saline water solution that has an elevated concentration of dissolved salts 124, 128 (block 602). The first and second electrodes 104 are operated in a forward direction or a reverse direction depending on the direction in which the first and second electrodes were previously operated (block 604). When the first and second electrodes 104, 108 are operated in the forward direction, the voltage $V_{IN}$ is applied to the first electrode 104 and the second electrode 108 is connected to ground. The first electrode 104 is configured to deintercalate cations 124 from the first electrode 104 into the saline solution present in first compartment 113 when operated in the forward direction. The second electrode 108 is configured to intercalate cations 124 from the saline solution present in the second compartment 115 into the second electrode 108 when operated in the forward direction.

When the first and second electrodes 104, 108 are operated in the reverse direction, the voltage $V_{IN}$ is applied to the second electrode 108 and the first electrode 104 is connected to ground. The second electrode 108 is configured to deintercalate cations 124 from the second electrode 108 into the saline solution present in second compartment 115 when operated in the reverse direction. The first electrode 104 is configured to intercalate cations 124 from the saline solution present in the first compartment 113 into the first electrode 104 when operated in the reverse direction. While the first and second electrodes 104, 108 are operated in the forward or reverse directions (block 604), a membrane voltage $V_M$ is applied to the AEM 112 via an external circuit (block 606). While the membrane voltage $V_M$ is applied to the AEM (block 606), a first diffusion rate $d_1$ of the cations 124 through the AEM 112 decreases and a second diffusion rate $d_2$ of anions 128 through the AEM increases relative to the first and second diffusion rates, respectively, when the membrane voltage $V_M$ is not applied to the AEM.

The method 600 generates a brine water solution in the first compartment 113 and a fresh water solution in the second compartment 115 when blocks 604 and 606 are concurrently executed and the first and second electrodes 104, 108 are operated in the forward direction. The brine and fresh water solution are generated in the second compartment 115 and the first compartment 113, respectively, when blocks 604 and 606 are concurrently executed and the first and second electrodes 104, 108 are operated in the reverse direction. The brine water solution has a higher concentration of dissolved salts 124, 128 than the concentration of dissolved salts in the saline water solution originally filled in the first compartment 113. The fresh water solution has a lower concentration of dissolved salts 124, 128 than the concentration of dissolved salts in the saline water solution originally filled in the second compartment 115.

The method 600 further includes separately extracting the brine water solution and the fresh water solution from the first and second compartments 113, 115 (block 608). The extraction of the brine and fresh water solutions from the container 102 can occur when a quantity of the cations 124 inserted into the first or second electrodes 104, 108 approaches or meets a capacity of the electrode. If another purification cycle is to be carried out (block 610), the method 600 returns to block 602 in which the first and second compartments 113, 115 of the container 102 are filled with the saline water solution. If another purification cycle is not to be carried out (block 610), the method 600 ends (block 612).

The method 600 in some embodiments can include a cleaning operation after the brine and fresh water solutions are extracted (block 608) and before the first and second compartments 113, 115 are refilled to prepare for a subsequent purification cycle (block 602). The cleaning operating cleans the first and second electrodes 104, 108 and the AEM 112 by immersing the electrodes and the AEM in clean water, acid (i.e., HCl), or base (i.e., NaOH). The cleaning operating can occur at regular intervals or as needed. After the cleaning operation is completed, the method 600 can end (block 612) or it can proceed to carry out another purification cycle according to blocks 602-608.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A desalination device, comprising:
   a container configured to contain a saline water solution having a concentration of dissolved salts in the form of anions and cations;
   a first electrode and a second electrode arranged in a first compartment and a second compartment, respectively, of the container, the first and second electrodes configured to be arranged in fluid communication with the saline water solution;
   an anion exchange membrane (AEM) separating the first and second compartments, the AEM having a porous membrane structure and a plurality of negatively-charged oxygen functional groups coupled to the porous membrane structure; and
   a power source configured to selectively apply a voltage to one of the first and second electrodes, the AEM having a selective permeability when the voltage is applied such that the cations have a first diffusion rate $d_1$ therethrough and the anions have a second diffusion rate $d_2$ therethrough where $0 \leq d_1 < d_2$, wherein:
   the power source is configured to apply a membrane voltage to the AEM via an external circuit, the AEM configured to decrease the first diffusion rate $d_1$ of the cations through the AEM and increase the second diffusion rate $d_2$ of the anions through the AEM in response to the applied voltage; and
   there is no cation exchange membrane separating the first and second compartments.

2. The desalination device of claim 1, wherein the porous membrane structure includes graphene oxide sheets.

3. The desalination device of claim 2, wherein the plurality of negatively-charged oxygen functional groups includes one or more of hydroxyl groups and carboxylic groups.

4. The desalination device of claim 2, wherein the plurality of negatively-charged oxygen functional groups includes one or more of epoxy groups and carbonyl groups.

5. The desalination device of claim 1, wherein the power source is configured to controllably apply a membrane voltage in a range from 0 to ±0.5 V to provide a reversible reaction between the cations and the AEM.

6. The desalination device of claim 1, wherein the AEM is configured such that a (de-)sorption voltage of the cations into and out of the AEM is in a range from −1.0 to 1.5 V relative to a standard hydrogen electrode.

7. The desalination device of claim 1, wherein the porous membrane structure includes mono- and few-layer graphene, the layers having a range from 1 to 8 layers.

8. The desalination device of claim 1, wherein the first and second electrodes are symmetric electrodes that contain an identical intercalation material.

9. The desalination device of claim 8, wherein the intercalation material is one of doped or un-doped cubic spinel $MnO_2$, tunnel-structured orthorhombic $Na_4Mn_9O_{18}$, or $NaM_2(PO_4)_3$ where M=Ti, Mn, Fe, Ni, Cu, or combinations thereof.

10. The desalination device of claim 1, wherein the first and second electrodes are asymmetric electrodes each containing an electrode material comprised of a metal oxide, a concentration of alkali metal within the metal oxide configured to be different between the electrode materials.

* * * * *